(12) United States Patent
Nakamura et al.

(10) Patent No.: US 6,523,909 B1
(45) Date of Patent: Feb. 25, 2003

(54) BEARING UNIT FOR WHEEL AND MANUFACTURING METHOD THEREOF

(75) Inventors: Yuji Nakamura, Fujisawa (JP); Hiroya Miyazaki, Fujisawa (JP); Yasunori Kawase, Ohtsu (JP); Takeyasu Kaneko, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/505,190

(22) Filed: Feb. 16, 2000

(30) Foreign Application Priority Data

Feb. 17, 1999 (JP) .......................................... 11-038329
Dec. 28, 1999 (JP) .......................................... 11-372393

(51) Int. Cl.⁷ .............................................. B60B 27/00
(52) U.S. Cl. ........... 301/105.1; 188/18 A; 188/218 XL; 29/898.09; 384/544
(58) Field of Search ....................... 301/6.1, 68, 35.62, 301/105.1; 180/252, 258, 259; 188/218 XL, 18 A; 29/898.07, 469, 898.09; 384/544

(56) References Cited

U.S. PATENT DOCUMENTS

| | | | |
|---|---|---|---|
| 4,621,700 A | 11/1986 | Merkelbach | |
| 4,699,431 A | * 10/1987 | Daberkoe | ............ 301/35.62 X |
| 4,792,020 A | 12/1988 | Okumura et al. | |
| 5,430,926 A | * 7/1995 | Hartford | .............. 29/898.09 X |
| 5,651,588 A | * 7/1997 | Kato | ................... 301/105.1 X |
| 5,782,565 A | * 7/1998 | Bertetti et al. | ......... 384/544 X |
| 5,842,388 A | 12/1998 | Visser et al. | ................. 82/1.11 |
| 5,884,980 A | 3/1999 | Visser et al. | ................. 301/6.1 |
| 5,899,305 A | * 5/1999 | Austin et al. | ......... 188/218 XL |
| 5,915,502 A | * 6/1999 | Rapisardi et al. | ......... 188/18 R |
| 5,937,499 A | * 8/1999 | Austin et al. | ............. 188/18 R |
| 6,158,124 A | 12/2000 | Austin | ..................... 29/898.09 |
| 2001/0019640 A1 | 9/2001 | Tajima et al. | |

FOREIGN PATENT DOCUMENTS

| | | |
|---|---|---|
| JP | 7-164809 | 6/1995 |
| JP | 10-217001 | 8/1998 |
| JP | 11-294425 | 10/1999 |

* cited by examiner

Primary Examiner—Russell D. Stormer
(74) Attorney, Agent, or Firm—Crowell & Moring LLP (57) ABSTRACT

A bearing unit for a wheel has a rotary ring whose raceway surface is hardened by a thermal process. In this bearing unit, the side surface of a fitting flange for fixedly joining a rotary body for braking and a wheel, is formed by working in a predetermined configuration after the raceway surface of the rotary ring has been subjected to the thermal process. The raceway surface of the rotary ring is worked in a predetermined configuration and dimensions on the basis of the side surface of the fitting flange. This bearing unit can restrain disagreeable noises and vibration from being caused upon braking.

13 Claims, 9 Drawing Sheets

BEARING UNIT FOR WHEEL AND MANUFACTURING METHOD THEREOF

This application claims the benefits of Japanese Application Nos. 11-038329 and 11-372393 which are hereby incorporated by reference.

BACKGROUND OF THE INVENTION

1. Field of the Invention

The present invention relates to an improvement of a bearing unit for supporting a wheel of an automobile as well as a rotary body for braking such as a rotor or a drum, and to an improvement of a method of manufacturing such bearing unit for the wheel.

2. Related Background Art

Figure 4:
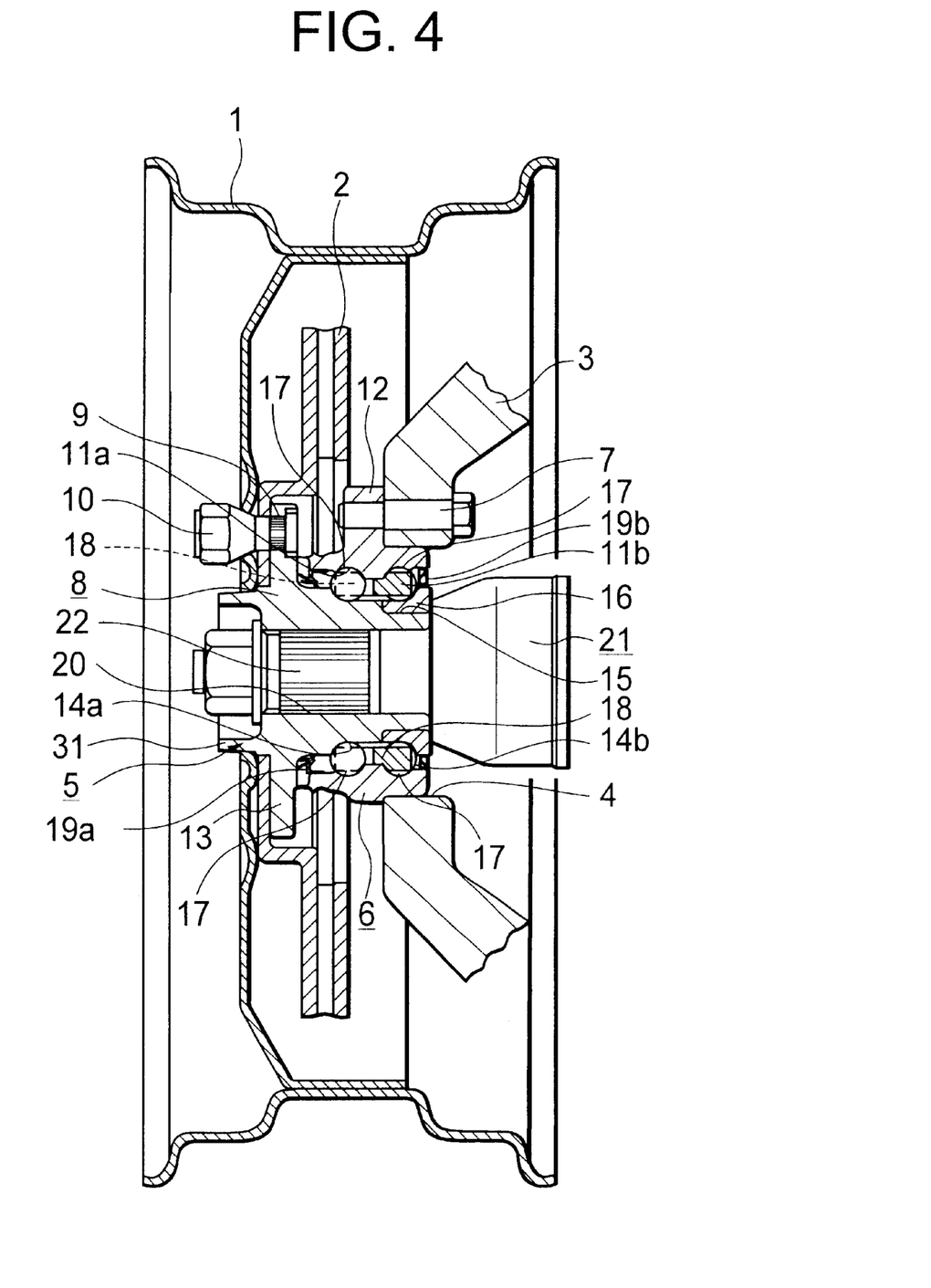
FIG. 4 is a sectional view showing one example of assembling a bearing unit for a wheel, to which the present inventions is applied.

A wheel 1 constituting a traveling wheel of an automobile and a rotor 2 constituting a disk brake classified as a braking device, are rotatably supported by a knuckle 3 as a component of a suspension on the basis of, for example, a structure shown in FIG. 4. To be more specific, a circular support hole 4 is formed in the knuckle 3. An outer ring 6 defined as a static ring constituting a bearing unit 5 for a wheel, to which the present invention is applied, is fixed to within the support hole 4a by use of a plurality of bolts 7. On the other hand, the wheel 1 and the rotor 2 are fixedly joined through a plurality of studs 9 and a plurality of nuts 10 to a hub 8 as a component of the wheel bearing unit 5.

Outer ring double raceways 11a, 11b each serving as a static-side raceway surface are formed in an inner peripheral surface of the outer ring 6, and a joint flange 12 is provided on an outer peripheral surface thereof. The thus configured outer ring 6 is fixed to the knuckle 3 by joining the joint flange 12 to the knuckle 3 with the bolts 7.

By contrast, a fitting flange 13 is provided at a portion protruding from an aperture of an outer side end (the term "outer or external" implies an outside portion in a widthwise direction in a state of being assembled to the automobile, i.e., the left side in each drawing. In contrast, the term "inner or internal" implies a central portion in the widthwise direction in the state of being assembled to the automobile, viz., the right side in each of the components.) of the outer ring 6. The wheel 1 and the rotor 2 are fixedly joined through the studs 9 and the nuts 10 to one single surface (an external surface in the illustrated example) of the fitting flange. Further, an inner ring raceway 14a is formed in a portion, facing to the more external raceway 11a of the outer ring double raceways 11a, 11b, of the outer peripheral surface of the intermediate portion of the hub 8. Moreover, the inner ring 16 is fixedly fitted onto a small-diameter stepped portion 15 provided at an inner side end of the hub 8. Then, the inner ring raceway 14b formed in the outer peripheral surface of the inner ring 16 is disposed facing to the more internal raceway 11b of the outer ring double raceways 11a, 11b.

Balls 17, 17 each defined as a rolling member are provided in a rollable manner by pluralities between the outer ring raceways 11a, 11b and the inner ring raceways 14a, 14b in a state of being held by retainers 18, 18. Based on this construction, a double-row angular ball bearing with a back face combination is structured, the hub 8 is rotatably supported in the outer ring 6, and a radial load and a thrust load are supported in a sustainable manner. Note that seal rings 19a, 19b are provided between inner peripheral surfaces of two side ends of the outer ring 6, an outer peripheral surface of an intermediate portion of the hub 8 and an outer peripheral surface of an inner side end of the inner ring 16, thus cutting off a space accommodating the balls 17, 17 from the outside space. Further, in the illustrated example, the wheel bearing unit 5 is structured for a drive wheel (corresponding to a rear wheel of a FR car and an RR car, a front wheel of an FF car, and whole wheels of a 4WD car), and hence a central portion of the hub 8 is formed with a spline hole 20. Then, a spline shaft 22 of a constant velocity joint 21 is inserted into the spline hole 20.

When using the roll bearing unit 5 for the wheel described above, as shown in FIG. 4, the outer ring 6 is fixed to the knuckle 3, and the rotor 2 and the wheel 1 assembled with an unillustrated tire are fixed to the fitting flange 13 of the hub 8. Further, the rotor 2 of those components is combined with an unillustrated support and an unillustrated caliper which are fixed to the knuckle 3, thus constituting a disk brake for braking. When braking, a pair of pads provided with the rotor being interposed therebetween are pressed against the two side surfaces of the rotor 2.

It is a known fact that vibrations called judder followed by disagreeable or annoying noises often occur when braking the wheels of the automobile. One of a variety of known causes of those vibrations may be an ununiform state of frictions between the side surface of the rotor 2 and the lining of the pad, however, deflections of the rotor 2 are also known as another large cause. More specifically, the side surface of the rotor 2 should be fundamentally right-angled to a rotational center of the rotor 2, however, a perfect perpendicularity is hard to obtain due to an inevitable manufacturing error. As a result, the side surface of the rotor 2 inevitably deflects more or less in directions of the rotational axis (right and left directions in FIG. 4) when the automobile travels. If such deflections (displacement quantities in the right and left directions in FIG. 4) increase, and if the linings of the pair of pads are pressed against the two side surfaces of the rotor 2 for braking, the judder occurs. Then, the contact between both surfaces of the rotor 2 and the respective linings of the pad becomes non-uniformed, wherein a partial abrasion of the linings is caused.

It is of much importance for restraining the judder occurred by such causes to decrease (axial) deflections of the side surface of the rotor 2 (to enhance the perpendicularity of the side surface to the central axis of rotation). Then, it is required that a perpendicularity of a fitting surface (one side surface of the fitting flange 13) of the fitting flange 13 to the rotational center of the hub 8 and a surface accuracy of the fitting surface itself be enhanced for restraining those deflections. Factors for exerting influences upon Us the perpendicularity and the surface accuracy might exist by pluralities, however, the factors having an especially large influence may be a parallelism between the fitting surface and the raceway surface (between the outer ring raceways 11a, 11b and the inner ring raceways 14a, 14b) with respect to the perpendicularity, and a thermal process deformation with respect to the surface accuracy. Further, for enhancing the parallelism of those factors, among the constructive elements of the hub 8, there must be a necessity for setting highly accurately a positional relationship between the one side surface of the fitting flange 13, the inner ring raceway 14a formed in the outer peripheral surface of the intermediate portion and the small-diameter stepped portion 15 provided at the inner side end, and configurations and dimensions of those components. If the accuracy of the configurations and the dimensions of the inner ring raceway 14a and of the small-diameter stepped portion 15 among those elements are enhanced in the above relationship with the fitting surface, the perpendicularity of the fitting surface to the rotational center of the hub 8 can be enhanced.

Moreover, if removing the thermal process deformation out of the fitting surface, the surface accuracy of this fitting surface can also be enhanced.

A technology for preventing the deflection of the fitting flange 13 which might conduce to the deflection of the rotor 2 may be what is disclosed in, e.g., Japanese Patent Application Laid-Open Publication No. 10-217001. The prior art disclosed in this Publication does not, however, deal with anything about thermally processing the respective components, wherein the costs wastefully increase because of precisely finishing the surface which is not essentially needed as the fiducial surface. While on the other hand, the inner ring raceway 14a and the small-diameter stepped portion 15 are hardened over their surfaces and therefore required to undergo the thermal process such as a high-frequency hardening process. Then, the configurations and dimensions of the inner ring raceway 14a and the small-diameter stepped portion 15 might more or less change subsequent to the thermal process, and hence, according to the prior art disclosed in the above Publication, it is difficult to sufficiently enhance the accuracy of each components in the way described above. Besides, the invention disclosed in the Publication given above takes a structure of fixing a couple of inner rings each separated from the hub to the outer peripheral surface of this hub, and therefore an error, etc. between the end surface of each inner ring and the inner ring raceway might be added as an error of parallelism between the fitting surface of the fitting flange and the inner ring raceway. Furthermore, a contact portion between the hub and the inner ring is not worked based on the fitting surface of the fitting flange, so that the parallelism between the fitting surface and the inner ring raceway is hard to sufficiently enhance.

Moreover, the bearing unit 5 for the wheel and the rotor 2 have hitherto been selectively combined in order to make offsets of the deflection of the fitting flange 13 and the deflection of the rotor 2 based on the configuration error of the rotor 2 itself. In this case, however, the selecting operation for the combination becomes laborious, resulting in an increase in cost.

SUMMARY OF THE INVENTION

It is a primary object of the present invention, which was devised under such circumstances, to improve a bearing unit for a wheel and a manufacturing method thereof.

To accomplish the above object, according to a first aspect of the present invention, a bearing unit for a wheel, comprises a static ring having a static-side raceway surface and fixedly supported by a suspension in a state of being used, a rotary ring having a rotary-side raceway surface hardened by a thermal process, a plurality of rolling members provided between the rotary-side raceway surface and the static-side raceway surface, and a fitting flange, provided on an outer peripheral surface of the rotary ring, for fixedly joining a rotary body for braking and a wheel to its side surface in a state of being used. In the thus constructed bearing unit for the wheel, the side surface of the fitting flange for fixedly joining the rotary body for braking and the wheel, is worked in a predetermined configuration after the rotary-side raceway surface has been subjected to the thermal process, and the rotary-side raceway surface is worked in a predetermined configuration and dimensions on the basis of the side surface of the fitting flange.

According to a second aspect of the present invention, a method of manufacturing a bearing unit for a wheel according to the first aspect of the invention, comprises a step of hardening a rotary-side raceway surface of a rotary ring by a thermal process, a step of thereafter working a side surface of a fitting flange in a predetermined configuration, and a step of subsequently working the rotary-side raceway surface in a predetermined configuration and dimensions by using the side surface of the fitting flange as a fiducial surface.

The bearing unit for the wheel according to the first aspect of the invention and the manufacturing method according to the second aspect of the invention, are capable of making normal a relationship between the rotary-side raceway surface and the side surface of the fitting flange irrespective of deformations of the respective components which are subsequent to a thermal process. As a result, it is feasible to restraining deflections of the rotary body for braking which is fixed to the fitting flange by enhancing a perpendicularity of the side surface of the fitting flange to the rotational center of the rotary ring.

According to a third aspect of the present invention, a wheel bearing unit with a rotary body for braking, comprises a static ring having a static-side raceway surface and fixedly supported by a suspension in a state of being used, a rotary ring having a rotary-side raceway surface hardened by a thermal process, a plurality of rolling members provided between the rotary-side raceway surface and the static-side raceway surface, a fitting flange provided on an outer peripheral surface of the rotary ring, and a rotary body for braking such as a rotor or drum, fixedly joined to one single surface of the fitting flange and having a braked surface against which a frictional material is pressed when braking. In the thus constructed wheel bearing unit with the rotary body for braking, the rotary-side raceway surface is worked in a predetermined configuration and dimensions on the basis of the braked surface of the rotary body for braking in a state where the rotary body for braking is fixedly joined to the one single surface of the fitting flange.

According to a fourth aspect of the present invention, a method of manufacturing a wheel bearing unit with a rotary body for braking according to the third aspect, comprises a step of hardening a rotary-side raceway surface of a rotary ring by a thermal process, a step of thereafter fixedly joining the rotary body for braking to one side surface of the fitting flange, and a step of subsequently working the rotary-side raceway surface in a predetermined configuration and dimensions by using the braked surface of the rotary body for braking as a fiducial surface.

According to a fifth aspect of the present invention, a wheel bearing unit with a rotary body for braking is constructed so that the braked surface of the rotary body for braking is worked in a predetermined configuration and dimensions on the basis of a fitting surface of the static ring to the suspension.

According to a sixth aspect of the present invention, a method of manufacturing a wheel bearing unit with a rotary body for braking according to the fifth aspect, comprises a step of hardening a rotary-side raceway surface of a rotary ring by a thermal process, a step of thereafter effecting a finishing work on the rotary-side raceway surface, a step of combining the rotary ring with the static ring through a plurality of rolling members, a step of fixedly joining the rotary body for braking to a side surface of the fitting flange, and a step of subsequently working the braked surf ace of the rotary body for braking in a predetermined configuration and dimensions by using the fitting surf ace of the static ring to the suspension as a fiducial surface.

In the wheel bearing units each having the rotary body for braking and the manufacturing methods thereof according to the third through sixth aspects, an assembling error between the fitting flange provided on the outer peripheral surf ace of the rotary ring and the fitting portion to the rotary body for braking such as the rotor, does not lead to the deflection of the braked surface of the rotary body for braking as in the case of a decline of perpendicularity of the two side surfaces of the rotor and so on. Namely, in the case of the structures and the manufacturing methods according to the third through sixth aspects also, the rotary-side raceway surface (corresponding to the third and fourth aspects) or the braked surface (corresponding to the fifth and sixth aspects) is worked in the state where the rotary ring and the rotary body for braking are joined as in the state of being used. Accordingly, the assembling error of the fitting portion exert no influence on the positional relationship between the rotary-side raceway surface and the braked surface, and there is no necessity for particularly enhancing the configuration accuracy of the members constituting the fitting portion and serving as a part of the fitting flange and of the rotary body for braking.

DESCRIPTION OF THE PREFERRED EMBODIMENTS

Figure 1:
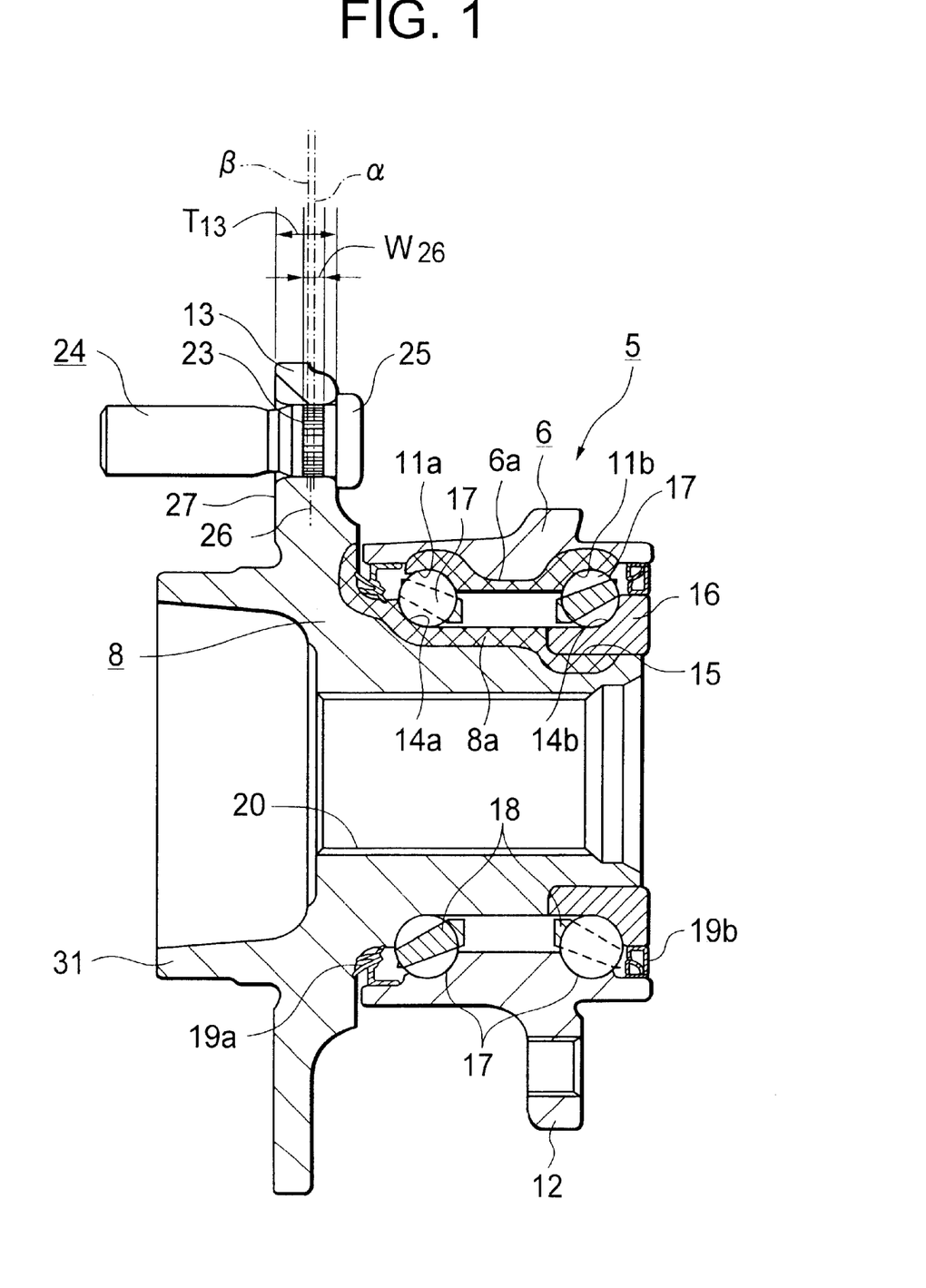
FIG. 1 is a sectional view showing a first embodiment of the present invention.
Figure 2:
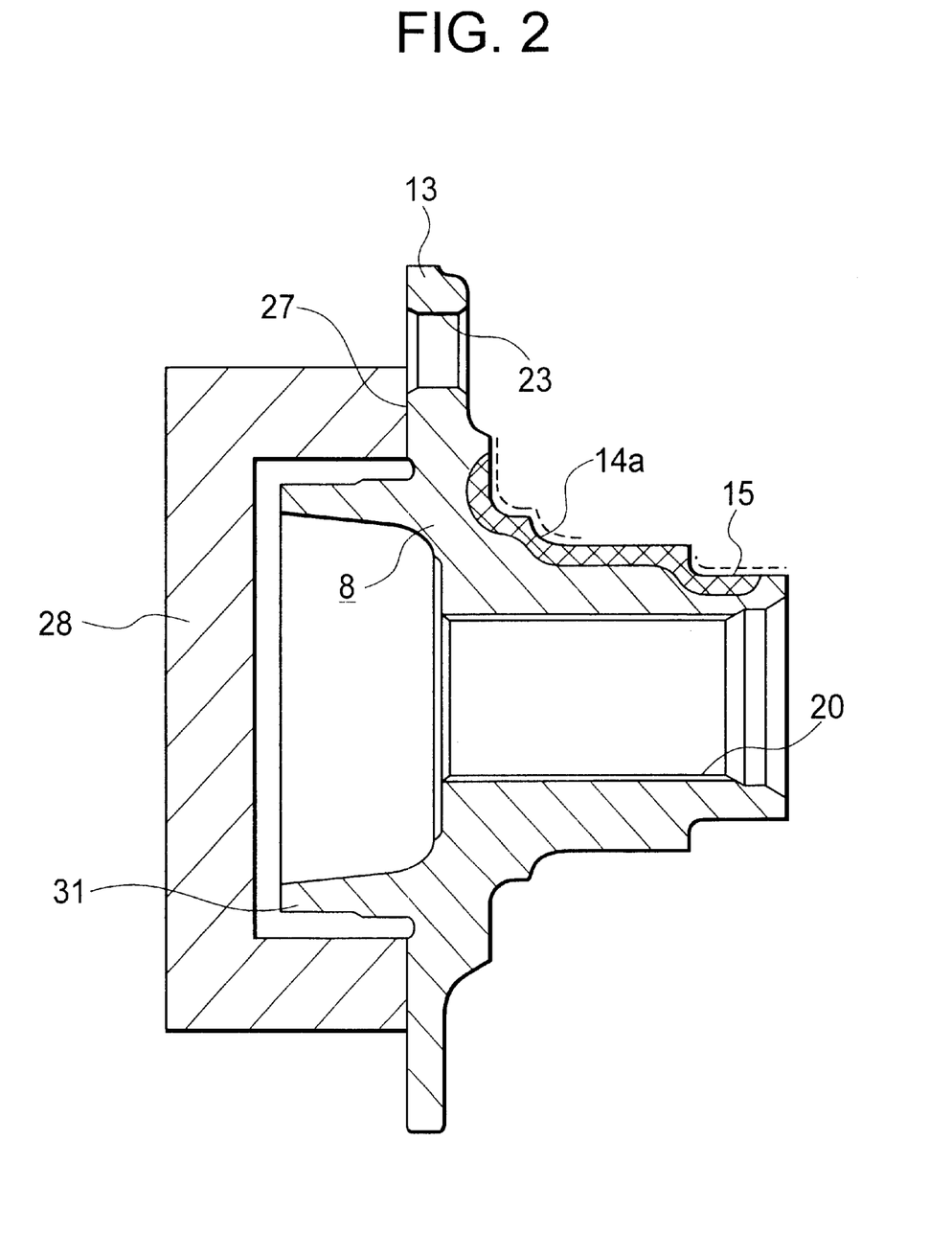
FIG. 2 is a sectional view showing a state of working an outer peripheral surface of a hub in the first embodiment.

FIGS. 1 and 2 show a first embodiment of the present invention. An outer peripheral surface of an outer ring 6 defined as a static ring is provided with a joint flange 12 for fixedly joining the outer ring 6 to a knuckle 3 (FIG. 4). Outer ring double raceways 11a, 11b each serving as a static-side raceway surface are formed in an inner peripheral surface of the outer ring 6 which is defined as a static-side peripheral surface. A portion 6a, indicated by lattice-hatching in an upper half part in FIG. 1 and embracing the outer ring raceways 11a, 11b, of the inner peripheral surface of an intermediate portion of the outer ring 6, is hardened over its entire periphery by high-frequency hardening.

Further, areas, facing to the outer ring raceways 11a, 11b, of outer peripheral surfaces of a hub 8 and an inner ring 16 which correspond to a rotary ring, are provided with inner ring raceways 14a, 14b each serving as a rotary-side raceway surface. To be more specific, the inner ring raceway 14a is formed directly in an outer peripheral surface of an intermediate portion of the hub 8, and the inner ring 16 having the inner ring raceway 14b formed in its outer peripheral surface is fixedly fitted on a small-diameter stepped portion 15 formed at an inner side end of this hub 8. The inner ring 16 is composed of a hard metal like bearing-steel such as SUJ2, and hardened to its core by the hardening process. Further, a fitting flange 13 for fixing a wheel 1 constituting a traveling wheel and a rotor 2 (FIG. 4) classified as a rotary body for braking or a drum, is provided at a portion closer to the outer side end of the intermediate portion of the hub 8 and protruding from an aperture of an outer side end of the outer ring 6.

Fitting holes 23 are respectively formed on the same circumference, concentric with a rotational center of the hub 8, in a plurality of positions in the circumferential direction of the fitting flange 13. Proximal ends of studs 24 are individually fixedly fitted in these fitting holes 23. Each of the studs 24 includes a collar 25 provided on a proximal end surface thereof and a serrated portion 26 formed, closer to the proximal end, on the outer peripheral surface of the intermediate portion. The thus configured stud 24 is inserted outward from inward (from right to left in FIG. 1) into the fitting hole 23, and the serrated portion 26 is fitted by pressing into the fitting hole 23. Then, the collar 25 is made to impinge upon an inside surface of the fitting flange 13. Note that a widthwise central position of the serrated portion 26 which is indicated by a chain line a in FIG. 1 is set more inward than a thicknesswise central position of the fitting flange 13 which is indicated by a chain line β in FIG. 1 in a state where the stud 24 is fixed to the fitting flange 13 in the way described above. The following is an elucidation of the reason why so.

In this embodiment, an external surface 27 (a left side surface in FIGS. 1 and 2) of the fitting flange 13 is set as a-fitting surface to which the wheel 1 and the rotor 2 should be fitted. Accordingly, there must be a necessity for preventing a decline of configuration accuracy of the external surface 27 to the greatest possible degree. While on the other hand, when the serrated portion 26 of the stud 24 is press-fitted into the fitting hole 23, the fitting flange 13 might deform to some extent in the vicinity of the fitting hole 23. This deformation might extend to the external surface 27, and, if the external surface 27 deforms in a convex-direction, a deflection of the rotor 2 fixedly joined to this external surface 27 tends to become large. Such being the case, the fitted portion between the fitting hole 23 and the serrated portion 26 is set inward as much as possible, thereby preventing the external surface 27 from deforming in the convex-direction due to the deformation of the flange 13. As a matter of course, a width $W_{26}$ of the serrated portion 26 is set well smaller than a thickness $T_{13}$ of the fitting flange 13 ($W_{26} \ll T_{13}$) within a range where a sufficient fitting strength can be ensured. In the illustrated embodiment, at the side end of the fitting hole 23, a chamfered large-diameter portion is formed in an aperture on the side of the external surface 27 by a counterboring work or lathe work. Hence, the convex-directional deformation of the external surface 27 due to the press-fitting of the serrated portion 26 can be prevented more surely. Further, though considered almost unnecessary, if the working on the external surface 27 is again performed after the press-fitting of the serrated portion 26, the distortion of the external surface 27 can be eliminated with a certainty.

Figure 5:
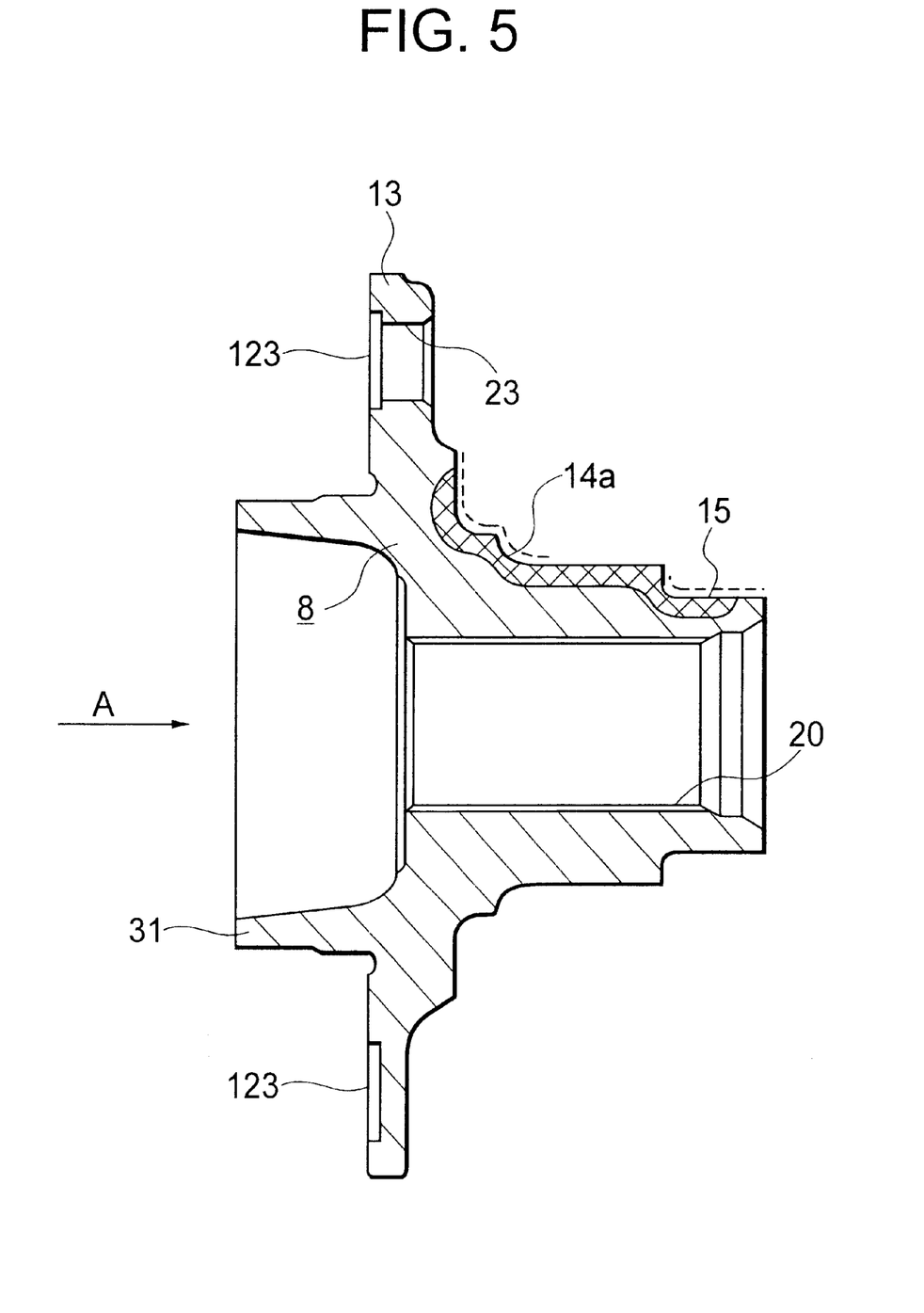
FIG. 5 is a sectional view showing a state of working the outer peripheral surface of the hub in a third embodiment of the present invention.
Figure 6:
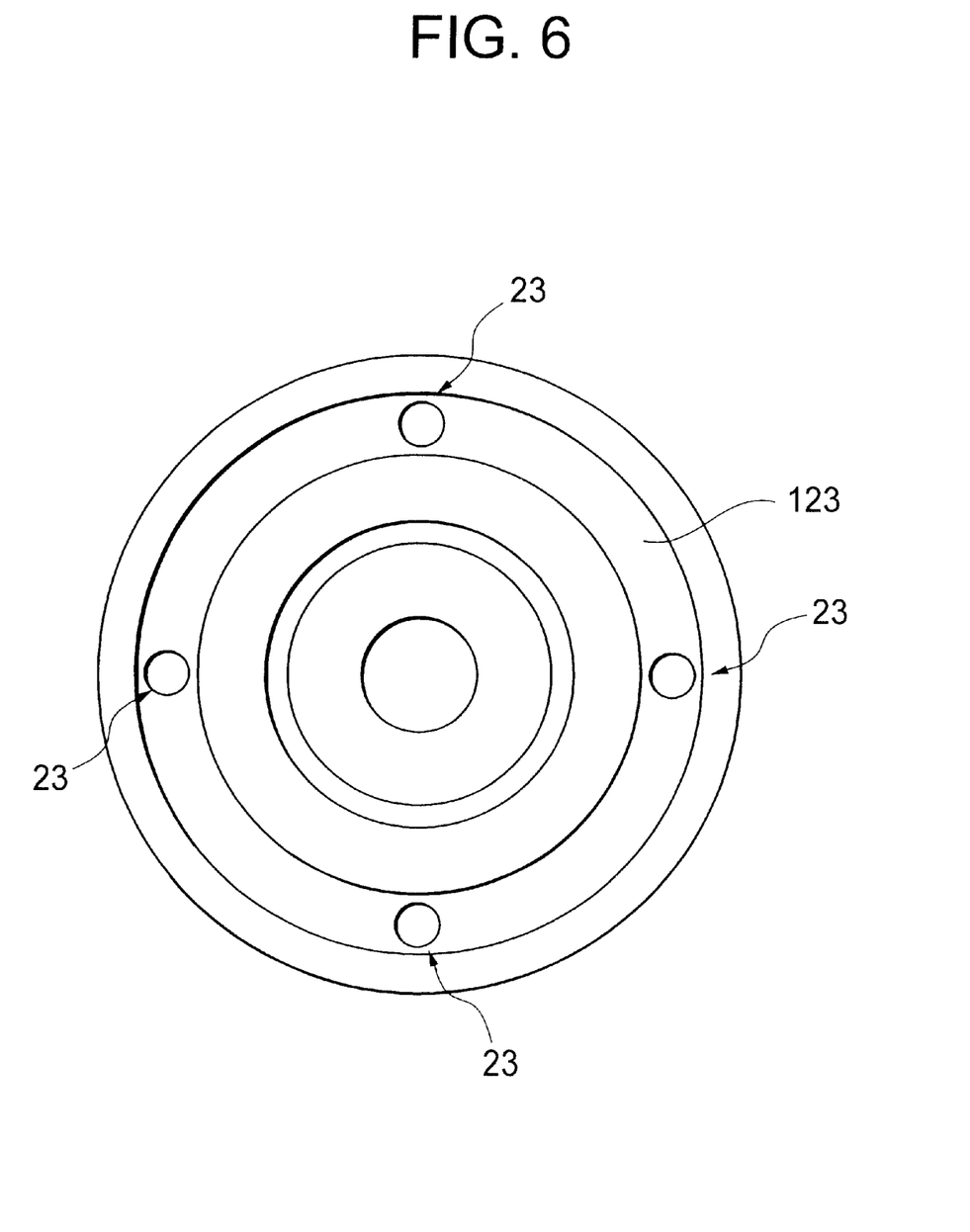
FIG. 6 is a view taken along the arrow line A in FIG. 5.

Moreover, as shown in FIGS. 5 and 6, an annular channel 123 communicating with all the fitting holes 23 may be previously formed in the external surface 27, thereby preventing the external surface 27 from being deformed and distorted based on the press-fitting of the serrated portion 26.

Further, the portion 8a, indicated by the lattice-hatching in the upper half part in FIG. 1, of the outer peripheral surface of the hub 8 is hardened over its entire periphery by the high-frequency hardening. Of this hardened portion 8a, the proximal end of the fitting flange 13 is hardened for preventing a plastic deformation of this proximal end irrespective of a large moment applied to the fitting flange 13 when traveling. In addition, the inner ring raceway 14a is hardened for preventing an impression from being formed in the inner ring raceway 14a regardless of a large surface pressure applied to a contact area between balls 17, 17 which will hereinafter be explained. Further, the small-diameter stepped portion 15 is hardened for preventing this small-diameter stepped portion 15 from being plastically deformed irrespective of a large radial load applied from the inner ring 16. Moreover, a portion between the small-diameter stepped portion 15 and the inner ring raceway 14a is hardened for preventing this in-between portion from being plastically deformed regardless of a large moment load and thrust load applied when travelling.

A plurality of balls 17, 17 each defined as a rolling member are provided in a state of being held by retainers 18, 18 between the outer ring raceways 11a, 11b and the inner ring raceways 14a, 14b. With this configuration, the hub 8 is rotatably supported on the side of an inside diameter of the outer ring 6, and the traveling wheel including the wheel 1 and the rotor 2 can be rotatably supported with respect to the knuckle 3. Note that seal rings 19a, 19b are provided between the inner peripheral surfaces of two side ends of the outer ring 6, the outer peripheral surface of the intermediate portion of the hub 8 and the outer peripheral surface of the inner side end of the inner ring 16 so as to cut off the space accommodating the balls 17, 17 from the outside space, thereby preventing a leak of grease sealed in the above space and foreign matters from entering this space.

In the thus constructed bearing unit 5 for the wheel, the external surface 27 of the fitting flange 13, for fixedly joining the wheel 1 and the rotor 2, is worked in the predetermined configuration after the outer peripheral surface 8a, indicated by the lattice-hatching in the upper half part in FIG. 1, of the intermediate portion of the hub 8 has been hardened by the high-frequency hardening process categorized as one type of thermal processes. That is, the lattice-hatching portion 8a undergoes the high-frequency thermal process and is thereby hardened. Then, the hub 8 comes to have a deformation based on the thermal process, and thereafter the outer periphery of the hub 8 as well as the external surface 27 are subjected to machining.

More in detail, the inner ring raceway 14a formed directly in the outer peripheral surface of intermediate portion of the hub 8 and the outer peripheral surface and the stepped surface of the small-diameter stepped portion 15 formed at the inner side end of the hub 8, are worked in predetermined configurations and predetermined dimensions on the basis of the external surface 27 as shown in FIG. 2, before or after the external surface 27 of the fitting flange 13 has been worked as the flat surface by lathe turning or the like machining. Even before working the flange surface, the surfaces of the inner ring raceway 14a and of the stepped portion 15 can be worked at by far higher accuracy than in the prior art because of the flange surface serving as the basis.

More specifically, a backing plate 28 abuts on the external surface 27 and is joined to the fitting flange 13 by a magnetic attractive force, etc. then, the hub 8 is rotated by rotating the backing plate 28. On this occasion, a rotational center of the hub 8 is an axis orthogonal to the external surface 27. Then, an unillustrated shoe is slid on the outer peripheral surface of the hub 8, and the inner ring raceway 14a and the outer peripheral surface and the stepped surface of the small-diameter stepped portion 15 are, as indicated by broken lines in FIG. 2, machined in desired configuration as by cut working or precision lathe working while being positioned in the radial direction of the hub 8.

The machining described above is performed in such a way that the axis orthogonal to the external surface 27 serves as the rotational center. Hence, the positional relationship among the external surface 27, the inner ring raceway 14a formed directly in the outer peripheral surface of the intermediate portion of the hub 8 and the inner ring raceway 14b formed in the outer peripheral surface of the inner ring 16 (FIG. 1) fitted on the small-diameter stepped portion 15, becomes normal irrespective of the thermal deformation based on the high-frequency hardening process described above. As a result, the deflection of the external surface 27 can be restrained down to a slight degree in a state where the wheel bearing unit 5 as illustrated in FIG. 1 is assembled.

Figure 3:
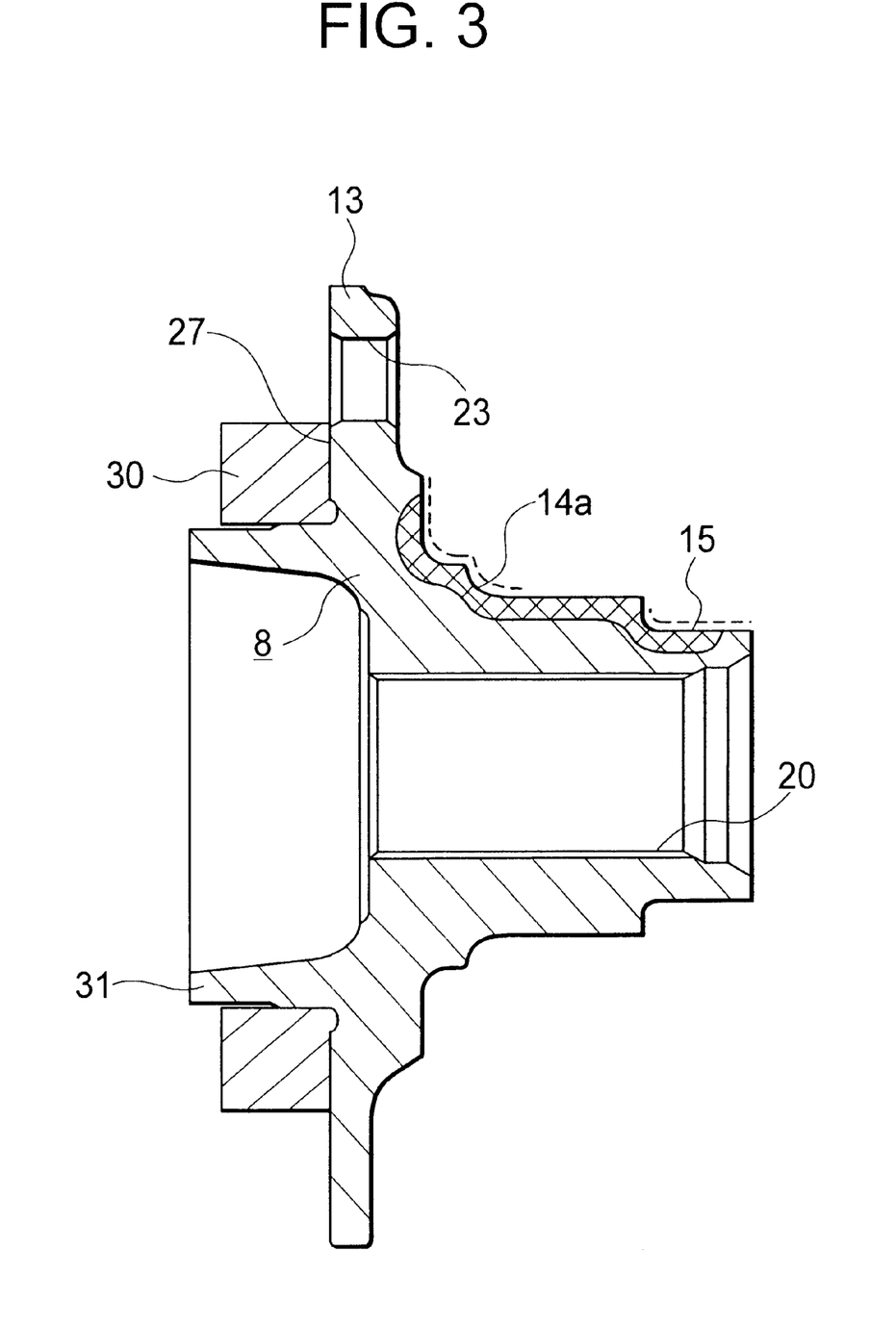
FIG. 3 is a sectional view showing a state of working the outer peripheral surface of the hub in a second embodiment.

Next, a second embodiment of the present invention will be shown in FIG. 3. In accordance with the second embodiment, after an external surface 27 of the fitting flange 13 provided on the outer peripheral surface of the hub 8 has been finished as a flat surface, in a state where the outer side end of the hub 8 is chucked by a chuck 30, the inner ring raceway 14a formed directly in the outer peripheral surface of the intermediate portion of the hub 8 and the outer peripheral surface and the stepped surface of the small-diameter stepped portion 15, are worked in predetermined configurations and dimensions. On this occasion, one single surface (a right end surface in FIG. 3) of the chuck 30 in the axial direction abuts on the external surface 27, and the external surface 27 is used as a fiducial surface for working. Further, an inner peripheral surface of the chuck 30 is brought into contact with an outer peripheral surface of a cylindrical member 31 provided at the external side end of the hub 8, thereby restraining a displacement in the radial direction of the hub 8. In the second embodiment discussed above, it is feasible to regulate more strictly the radial positions of the inner ring raceway 14a formed directly in the outer peripheral surface of the intermediate portion of the hub 8 and of the outer peripheral surface of the small-diameter stepped portion 15 formed at the inner side end of the hub 8. As a result, vibrations of the car when traveling can be decreased by restraining the radial displacements of the wheel 1 and of the rotor 2 (FIG. 4). Other configurations and operations are the same as those in the first embodiment, and hence the repetitive explanations and illustrations of the same components are herein omitted.

Figure 7:
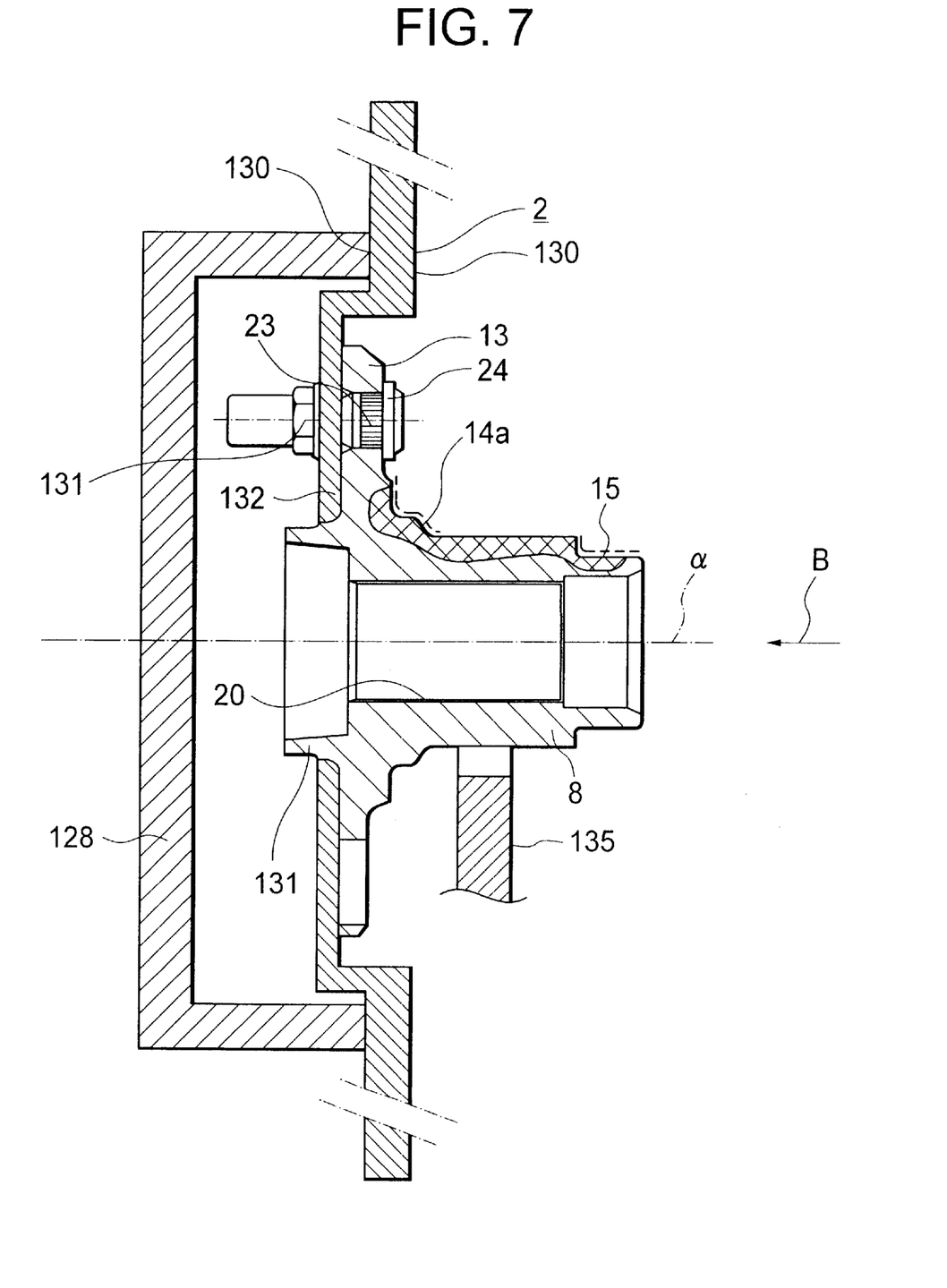
FIG. 7 is a principal sectional view showing a fourth embodiment of the present invention.
Figure 8:
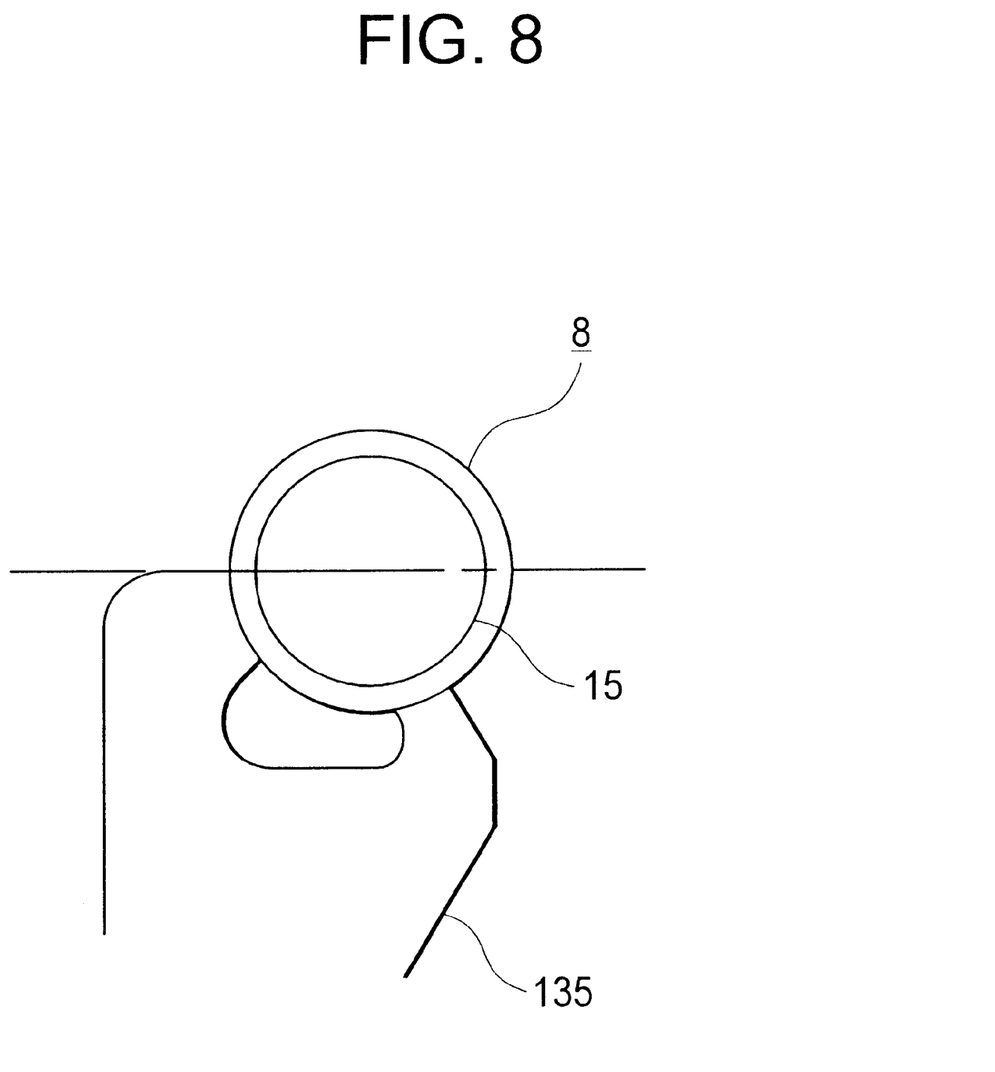
FIG. 8 is a view taken along the arrow line B in FIG. 7.

FIGS. 7 and 8 show a fourth embodiment of the present invention. Note that a feature of the present invention is a point of improving a perpendicularity of two side surfaces 130, 130 of the rotor 2 to the central axis α of the rotation of the hub 8 irrespective of an assembling error of the fitting portion between the fitting flange provided on the outer peripheral surface of the hub 8 and the rotor 2 defined as the rotary body for braking. Other structures are the same as those shown in FIG. 4 or in the embodiments discussed above, and therefore the like components are omitted or simplified in terms of their explanations and illustrations. The following discussion will be focused on the characteristic elements of the present invention.

The rotor 2 classified as the rotary body for braking is joined by a plurality of studs 24 and a plurality of nuts 131 to the fitting flange 13 provided at a portion closer to the outer side end of the intermediate portion of the hub 8 corresponding to a rotary ring together with the inner ring 16 (see FIG. 4). Further, the portion, indicated by lattice-hatching in the upper half part in FIG. 1, of the outer peripheral surface of the hub 8 is hardened over its entire periphery by the high-frequency hardening process. Moreover, the two side surfaces 130, 130 of the rotor 2 are worked in desired configurations in the process of manufacturing the rotor 2. More specifically, those two side surfaces 130, 130 are paralleled to each other as well as to two side surfaces of a joint flange 132 provided at a portion closer to the inner periphery in order to be fixedly joined to the fitting flange 13. Parallelisms of the two side surfaces of the joint flange 132 with respect to the above two side surfaces 130, 130 may not be so precise.

In the way described above, the outer peripheral surface of the hub 8 is hardened, and the rotor 2 is fixedly joined to the fitting flange 13. Then, based on one of the two side surfaces 130, 130, the inner ring raceway 14a formed directly in the outer peripheral surface-of the intermediate portion of the hub 8 and the outer peripheral surface of the small-diameter stepped portion 15 and the stepped surface of the same, are worked in the predetermined configurations and dimensions. To be specific, the backing plate 128 abuts on one (the outer side surface in the illustrated embodiment) of the side surfaces 130,130 of the rotor 2, and is joined to the rotor 2 by the magnetic attractive force, etc. Subsequently, the hub 8 is rotated by rotating this backing plate 128. On this occasion, the rotational center of the hub 8 is an axis orthogonal to the two side surfaces 130, 130 of the rotor 2. Then, a shoe 135 is slid on the outer peripheral surface of the hub 8, and the inner ring raceway 14a and the outer peripheral surface of the small-diameter stepped portion 15 and the stepped surface of the same are, as indicated by broken lines in FIG. 7, machined in desired surface configuration as by cut working or precision lathe working while being positioned in the radial direction of the hub 8. Incidentally, the position where the shoe 135 is slid on the outer peripheral surface of the hub 8 is not limited to the position shown in FIG. 7 but may be properly shifted such as on the outer peripheral surface of the small-diameter stepped portion 15 or the inner ring raceway 14a. In short, the shoe 135 abuts upon a portion opposite in position in the diametrical direction to the portion where the machining is effected at that point of time.

The machining described above is carried out, wherein the axis orthogonal to the two side surfaces 130, 130 of the rotor 2 serves as the rotational center. Hence, the positional relationship among those two side surfaces 130, 130, the inner ring raceway 14a formed directly in the outer peripheral surface of the intermediate portion of the hub 8 and the inner ring raceway 14b formed in the outer peripheral surface of the inner ring 16 (FIGS. 1 and 4) fitted on the small-diameter stepped portion 15, becomes normal irrespective of the thermal deformation based on the high-frequency hardening process described above. As a result, the deflections of the two side surfaces 130, 130 rotatably supported by the wheel bearing unit 5 as illustrated in FIG. 1 can be restrained down to a slight degree in a state where the wheel bearing unit 5 is assembled.

Besides, the assembling error of the fitting portion between the joint flange 132 of the rotor 2 and the fitting flange 13 of the hub 8 exerts no influence upon the positional relationship between the inner ring raceway 14a defined as a rotary-side raceway (as well as the inner ring raceway 14b formed in the outer peripheral surface of the inner ring 16) and the two side surfaces 130, 130 of the rotor 2 which may be conceived as braked surfaces (as far as the assembling error does not extremely worsen). Accordingly, there is no necessity for particularly enhancing accuracy of the configurations of the joint flange 32 and of the fitting flange 13. As a consequence, it is feasible to restrain the costs needed for minimizing the deflections of the two side surfaces 130, 130 of the rotor 2.

Figure 9:
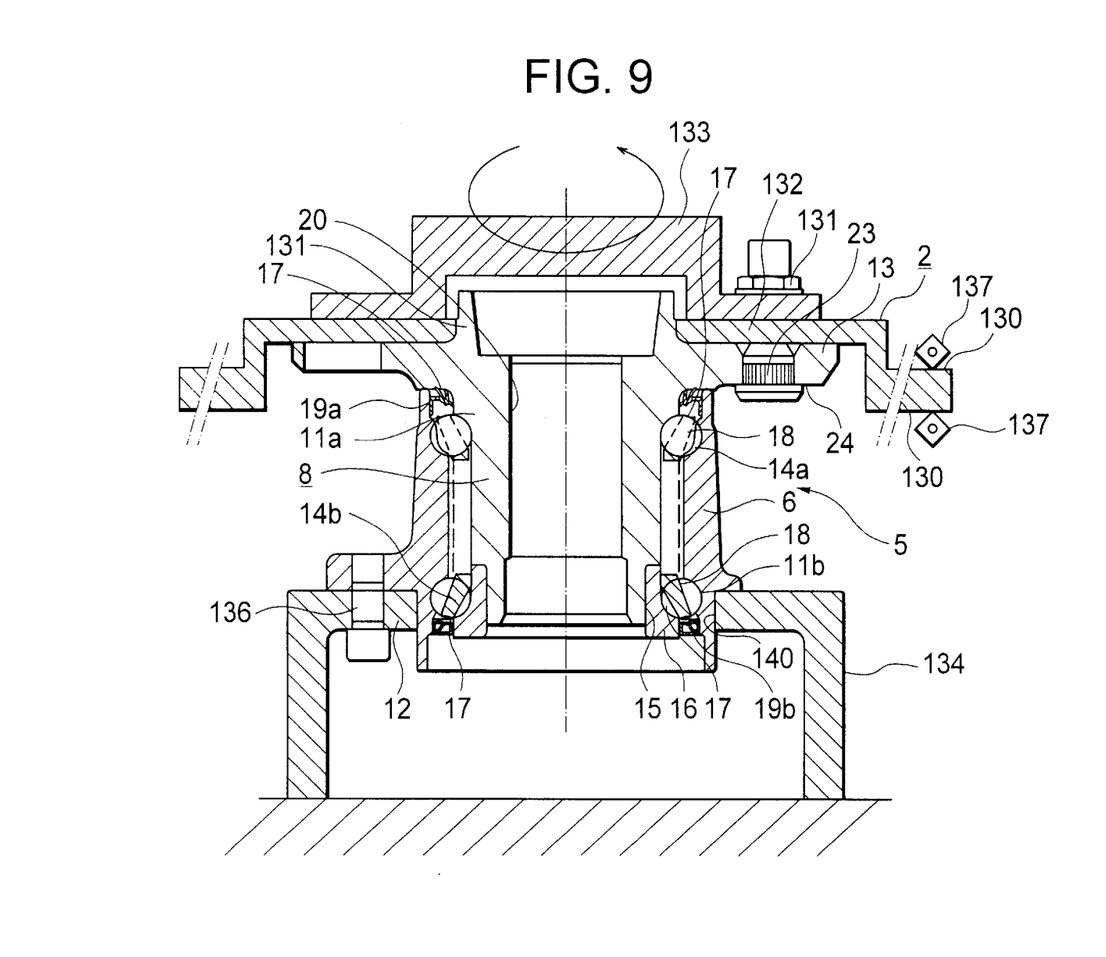
FIG. 9 is a sectional view showing a state of working two side surfaces of a rotor defined as a rotary body for braking in a fifth embodiment of the present invention.

Next, FIG. 9 shows a fifth embodiment of the present invention. In contrast with the fourth embodiment discussed above, the fifth embodiment takes such a construction that the two side surfaces 130, 130 of the rotor 2, which are the braked surfaces of the rotary body for braking, are worked in predetermined configurations and dimensions on the basis of a fitting surface, with respect to the knuckle 3 (see FIG. 4) constituting a suspension, of the outer ring 6 defined as a static ring.

That is, in the fifth embodiment, to start with, the portion, including the inner ring raceway 14a defined as the rotary-side raceway surface, of the hub 8 is hardened by the thermal process, and a finishing work is effected on a necessary portion, inclusive of the inner ring raceway 14a, of the portion hardened by the thermal process. The hardening by the thermal process and the finishing work are performed by, e.g., the method as described with reference to FIGS. 1 and 2 or 3. After the necessary portion of the hub 8 has been thus worked, the hub 8 and the outer ring 6 as the static ring are combined through the plurality of balls 17, 17 each serving as the rolling member, thereby constituting the wheel bearing unit 5. Thereafter, the rotor 2 as the rotary body for braking is fixedly joined through the plurality of studs 24 and the plurality of nuts 131 to the external surface (an upper surface in FIG. 9) of the fitting flange 13 provided on the outer peripheral surface of the hub 8. Note that a driving jig 133 for rotationally driving the rotor 2 is, in addition to the rotor 2, fixedly joined to the external surface of the fitting flange 13 in the embodiment illustrated in FIG. 9. This driving jig 133 is, as will hereinafter be described, after the two side surfaces 130, 130 of the rotor 2 have been subjected to the finishing work, removed from the fitting flange 13. Note that the driving jig 133 described above may not be fixedly joined to the rotor 2 but can be detached therefrom by the magnetic attractive force, etc.

In any case, as explained above, after the fitting flange 13 has been fixedly joined to the rotor in the way described above, the two side surfaces 130, 130 of the rotor 2 are worked in the predetermined configurations and dimensions, wherein the fitting surface, to the knuckle 3 (FIG. 4) constituting the suspension, of the outer ring 6 is used as the fiducial surface. For attaining this, in accordance with the fifth embodiment, an inner side end ( a lower side end in FIG. 9) of the outer ring 6 is fitted with no backlash into a support hole 140 formed in a support member 134, subsequently one single surface (a lower surface in FIG. 9) of the joint flange 12 provided on the outer peripheral surface of the outer ring 6 abuts on the upper surface of the support member 134, and the joint flange 12 is fixedly joined through a bolt 136 to the support member 134. Then, the hub 8 and the rotor 2 are rotationally driven by an unillustrated driving device through the driving jig 133, and in the meantime the two side surfaces 130, 130 of the rotor 2 undergo the finishing work by use of tools 137, 137 such as precision work cutting tools. As a matter of course, these tools 137, 137 perform the finishing work of the two side surfaces 130, 130 while moving in parallel to the upper surface of the support member 134.

The wheel bearing unit 5 is manufactured by the methods as described with reference to FIGS. 1, 2 or 3, and the external surface (the upper surface in FIG. 9) of the fitting flange 13 exhibits a high perpendicularity to the rotational center of the hub 8. Further, a generally known conventional technology might be sufficient for setting the rotational center of the hub 8 concentric with the central axis of the outer ring 6 and ensuring the perpendicularity of the joint surface (the lower surface in FIG. 9) of the joint flange 12 with respect to the central axis of the outer ring 6. Accordingly, the parallelism of the external surface of the fitting flange 13 with the joint surface of the joint flange 12 can be sufficiently obtained by combining the method as described with reference to FIGS. 1, 2 or 3, with the generally known conventional technology. In addition, in the case of the fifth embodiment, as discussed above, the two side surfaces 130, 130 of the rotor 2 undergo the finishing work while rotationally driving the hub 8 and the rotor 2. It is therefore possible to ensure the sufficient parallelisms of the two side surfaces 130, 130 of the rotor 2 with the joint surface of the joint flange 12 without enhancing especially the accuracy of the configurations of the fitting flange 13 and of the joint flange 132 provided closer to the inner periphery of the rotor 2. As a result, it is possible to minimize the costs required for restraining the deflections of the two side surfaces 130, 130 of the rotor 2 down to the small level.

The wheel bearing unit with the rotary body for braking and the manufacturing method thereof according to the present invention, have the above-described constructions and operations, and hence it is feasible to restrain disagreeable noises and vibrations caused when braking without increasing particularly the costs.

What is claimed is:

1. A bearing unit for a wheel, comprising:
   a static ring having a raceway surface and adapted to be fixedly supported by a suspension in use;
   a rotary ring having a raceway surface hardened by a thermal process;
   a plurality of rolling members provided between the raceway surface of the rotary ring and the raceway surface of the static ring; and
   a fitting flange, provided on an outer peripheral surface of said rotary ring, for fixedly joining a rotary body for braking and a wheel to a side surface of said flange when in use,
   wherein the side surface of said fitting flange for fixedly joining said rotary body for braking and said wheel, is worked in a predetermined configuration after the raceway surface of the rotary ring has been subjected to the thermal process, and
   the raceway surface of the rotary ring is worked in a predetermined configuration and dimensions based on the side surface of said fitting flange after the side surface of said fitting flange has been worked in the predetermined configuration.

2. A method of manufacturing a bearing unit for a wheel having:
   a static ring having a raceway surface and adapted to be fixedly supported by a suspension in use;
   a rotary ring having a raceway surface hardened by a thermal process;
   a plurality of rolling members provided between the raceway surface of the rotary ring and the raceway surface of the static ring; and
   a fitting flange, provided on an outer peripheral surface of said rotary ring, for fixedly joining a rotary body for braking and a wheel to a side surface of said flange when in use,
   wherein the side surface of said fitting flange for fixedly joining said rotary body for braking and said wheel, is worked in a predetermined configuration after the raceway surface of the rotary ring has been subjected to the thermal process, and
   the raceway surface of the rotary ring is worked in a predetermined configuration and dimensions based on the side surface of said fitting flange after the side surface of said fitting flange has been worked in the predetermined configuration;
   said method comprising:
   hardening the raceway surface of the rotary ring by a thermal process;
   thereafter working the side surface of the fitting flange in the predetermined configuration; and
   subsequently working the raceway surface of the rotary ring in the predetermined configuration and dimensions by using the side surface of said fitting flange as a fiducial surface.

3. A wheel bearing unit with a rotary body for braking, comprising:
   a static ring having a raceway surface and adapted to be fixedly supported by a suspension in use;
   a rotary ring having a raceway surface hardened by a thermal process;
   a plurality of rolling members provided between the rotary-side raceway surface and the static-side raceway surface;
   a fitting flange provided on an outer peripheral surface of said rotary ring; and
   a rotary body for braking, fixedly joined to one side surface of said fitting flange and having a braked surface against which a frictional material is pressed when braking,
   wherein the rotary-side raceway surface is worked in a predetermined configuration and dimensions based on the braked surface of said rotary body for braking in a state where said rotary body for braking is fixedly joined to the one side surface of said fitting flange.

4. A method of manufacturing a wheel bearing unit with a rotary body for braking having:
   a static ring having a raceway surface and adapted to be fixedly supported by a suspension in use;
   a rotary ring having a raceway surface hardened by a thermal process;
   a plurality of rolling members provided between the rotary-side raceway surface and the static-side raceway surface;
   a fitting flange provided on an outer peripheral surface of said rotary ring; and
   a rotary body for braking, fixedly joined to one side surface of said fitting flange and having a braked surface against which a frictional material is pressed when braking,
   wherein the rotary-side raceway surface is worked in a predetermined configuration and dimensions based on the braked surface of said rotary body for braking in a state where said rotary body for braking is fixedly joined to the one side surface of said fitting flange,
   said method comprising:
   hardening the rotary-side raceway surface of the rotary ring by the thermal process;
   thereafter fixedly joining said rotary body for braking to the one side surface of said fitting flange; and
   subsequently working the rotary-side raceway surface in the predetermined configuration and dimensions by using the braked surface of said rotary body for braking as a fiducial surface.

5. A bearing unit for a wheel, comprising:

a static ring having a plurality of static raceway surfaces and supported by a suspension in use;

a rotary raceway ring having a plurality of rotary raceway surfaces;

a plurality of rolling members interposed between the static raceway surfaces and the corresponding rotary raceway surfaces; and a fitting flange, having an internal surface and an external surface and provided on an outer peripheral surface of said rotary ring, for fixedly joining said rotary body for braking and said wheel to the external surface thereof in use, wherein the external surface of said fitting flange is worked in a predetermined configuration after an outer peripheral surface of an intermediate portion of said rotary ring has been hardened by a hardening process; and wherein a rotary raceway surface of the intermediate portion of said rotary ring in the axial direction is worked in a predetermined configuration and dimensions-based-on said external surface.

6. A bearing unit for a wheel according to claim 5, wherein said fitting flange has a plurality of circumferentially disposed holes adapted to receive a plurality of studs for fixedly joining said rotary body for braking and said wheel to the external surface of said fitting flange in use.

7. A bearing unit for a wheel according to claim 6, further comprising a plurality of studs disposed in said plurality of holes.

8. A method of manufacturing a bearing unit for a wheel, including:

a static ring having a plurality of static raceway surfaces and supported by a suspension in use;

a rotary raceway ring having a plurality of rotary raceway surfaces;

a plurality of rolling members interposed between the static raceway surfaces and the corresponding rotary raceway surfaces; and a fitting flange, having an internal surface and an external surface and provided on an outer peripheral surface of said rotary ring, for fixedly joining said rotary body for braking and said wheel to the external surface thereof in use, said method comprising:

working the external surface of said fitting flange in a predetermined configuration after an outer peripheral surface of an intermediate portion of said rotary ring has been hardened by a hardening process; and working one of the rotary raceway surfaces of the intermediate portion of said rotary ring in the axial direction in a predetermined configuration and dimensions based on said external surface.

9. A method of manufacturing a bearing unit for a wheel according to claim 8, wherein said fitting flange has a plurality of circumferentially disposed holes adapted to receive a plurality of studs for fixedly joining said rotary body for braking and said wheel to the external surface of said fitting flange in use.

10. A method of manufacturing a bearing unit for a wheel according to claim 9, wherein said fitting flange further comprises a plurality of studs disposed in said plurality of holes.

11. A method of manufacturing a bearing unit for a wheel having:

a static ring having a raceway surface and adapted to be fixedly supported by a suspension in use;

a rotary ring having a raceway surface hardened by a thermal process;

a plurality of rolling members provided between the raceway surface of the rotary ring and the raceway surface of the static ring; and a fitting flange, provided on an outer peripheral surface of said rotary ring, for fixedly joining a rotary body for braking and a wheel to a side surface of said flange when in use, wherein the side surface of said fitting flange for fixedly joining said rotary body for braking and said wheel, is worked in a predetermined configuration after the raceway surface of the rotary ring has been subjected to the thermal process, and the raceway surface of the rotary ring is worked in a predetermined configuration and dimensions based on the side surface of said fitting flange after the side surface of said fitting flange has been worked in the predetermined configuration;

said method comprising:

hardening the raceway surface of the rotary ring by a thermal process;

thereafter working the side surface of the fitting flange in a predetermined configuration; and subsequently working the raceway surface of the rotary ring and a small-diameter stepped portion at an inner side end of said rotary ring in a predetermined configuration and dimensions by using the side surface of said fitting flange as a fiducial surface.

12. A method of manufacturing a bearing unit for a wheel according to claim 2 or 11, wherein said working steps each include cut working or precision lathe working.

13. A method of manufacturing a bearing unit for a wheel according to claim 11, wherein said raceway working step and said stepped portion working step are performed simultaneously.

\* \* \* \* \*